US011113986B2

(12) United States Patent
Cheng et al.

(10) Patent No.: US 11,113,986 B2
(45) Date of Patent: Sep. 7, 2021

(54) STORY MACHINE, CONTROL METHOD AND CONTROL DEVICE THEREFOR, STORAGE MEDIUM AND STORY MACHINE PLAYER SYSTEM

(71) Applicant: Beijing Xiaomi Mobile Software Co., Ltd., Beijing (CN)

(72) Inventors: Liang Cheng, Beijing (CN); Yongfeng Xia, Beijing (CN); Jialin Fan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 470 days.

(21) Appl. No.: 16/204,568

(22) Filed: Nov. 29, 2018

(65) Prior Publication Data

US 2019/0164447 A1    May 30, 2019

(30) Foreign Application Priority Data

Nov. 30, 2017 (CN) .......................... 201711243534.7

(51) Int. Cl.
*G09B 19/00* (2006.01)
*A63H 5/00* (2006.01)
(Continued)

(52) U.S. Cl.
CPC .............. *G09B 19/00* (2013.01); *A63H 3/28* (2013.01); *A63H 5/00* (2013.01); *A63H 17/36* (2013.01);
(Continued)

(58) Field of Classification Search
CPC ...... G06F 3/0321; G06F 3/0483; G09B 19/00
See application file for complete search history.

(56) References Cited

U.S. PATENT DOCUMENTS 8,628,331 B1 *  1/2014  Wright ................... G09B 19/00
                                                434/236
8,914,139 B2 * 12/2014  Badavne ................ G06N 3/008
                                                 700/94
(Continued)

FOREIGN PATENT DOCUMENTS

CN    103456203 A    12/2013
CN    104793618 A     7/2015
(Continued)

OTHER PUBLICATIONS

Notification to grant patent right dated Oct. 29, 2020 in corresponding Chinese Patent Application No. 201711243534.7 (with English Translation), 6 pages.
(Continued)

*Primary Examiner* — David E Choi
(74) *Attorney, Agent, or Firm* — Oblon, McClelland, Maier & Neustadt, L.L.P.

(57) ABSTRACT

The disclosure relates to a story machine, a control method and control device thereof, a storage medium and a story machine player system are provided. The story machine includes circuitry configured to detect movement indication information for indicating a first movement path of the story machine; control the story machine to move along the first movement path based on the detected movement indication information; detect play indication information for indicating multimedia information; control the story machine to stop moving in response to detecting the play indication information; and play the multimedia information based on the detected play indication information.

20 Claims, 18 Drawing Sheets

(51) Int. Cl.
 A63H 17/36 (2006.01)
 G11B 27/10 (2006.01)
 A63H 3/28 (2006.01)
 A63H 17/395 (2006.01)
 G06F 3/03 (2006.01)
 G06F 3/0483 (2013.01)
(52) U.S. Cl.
 CPC ......... *A63H 17/395* (2013.01); *G06F 3/0321* (2013.01); *G06F 3/0483* (2013.01); *G11B 27/105* (2013.01); *A63H 2200/00* (2013.01)

(56) References Cited

U.S. PATENT DOCUMENTS

| | | | | |
|---|---|---|---|---|
| 9,224,309 | B2* | 12/2015 | Mutlu | A61B 5/374 |
| 2006/0257830 | A1* | 11/2006 | Lin | G09B 5/04 |
| | | | | 434/167 |
| 2007/0166004 | A1 | 7/2007 | Kim | |
| 2010/0048090 | A1* | 2/2010 | Wang | A63H 3/28 |
| | | | | 446/297 |
| 2013/0178961 | A1* | 7/2013 | Ly | G11B 27/031 |
| | | | | 700/94 |
| 2014/0029914 | A1* | 1/2014 | Deglise | G11B 27/34 |
| | | | | 386/241 |
| 2015/0379092 | A1* | 12/2015 | Becker | G06F 16/34 |
| | | | | 707/769 |
| 2017/0200390 | A1* | 7/2017 | Seymour | G09B 5/02 |
| 2019/0164447 | A1* | 5/2019 | Cheng | A63H 5/00 |

FOREIGN PATENT DOCUMENTS

| | | |
|---|---|---|
| CN | 105288983 A | 2/2016 |
| CN | 105396295 A | 3/2016 |
| CN | 205428305 U | 8/2016 |
| CN | 107398905 A | 11/2017 |
| GB | 2 364 930 A | 2/2002 |
| KR | 10-0708274 B1 | 4/2007 |
| KR | 10-2012-0044961 A | 5/2012 |

OTHER PUBLICATIONS

Second office action dated Jan. 6, 2020 in corresponding Chinese Patent Application No. 201711243534.7 (with English Translation), 19 pages.

Third office action dated Jul. 23, 2020 in corresponding Chinese Patent Application No. 201711243534.7 (with English Translation), 22 pages.

Combined Chinese Office Action and Search Report dated May 20, 2019 in corresponding Chinese Patent Application No. 201711243534.7 (with English Translation and English Translation of Category of Cited Documents), 22 pages.

Extended European Search Report dated May 8, 2019 in corresponding European Patent Application No. 18208912.8, 7 pages.

* cited by examiner

STORY MACHINE, CONTROL METHOD AND CONTROL DEVICE THEREFOR, STORAGE MEDIUM AND STORY MACHINE PLAYER SYSTEM

CROSS-REFERENCE TO RELATED APPLICATION

This application is based on and claims priority to Chinese Patent Application No. 201711243534.7, filed on Nov. 30, 2017, the entire contents of which are incorporated herein by reference.

TECHNICAL FIELD

The present disclosure relates to the field of electronic technology, and more particularly to a story machine, a control method and control device thereof, a storage medium and a story machine player system.

BACKGROUND

Listening to stories can foster children's language skills and imagination abilities. A story machine allows children to enjoy music, listen to stories, and develop their language skills.

A story machine with a point-reading function (e.g., a point-reading pen) may send out different audio by clicking on different areas in a book. For example, the book may include a picture of "a little tadpole," a picture of "a pig," and the like. The point-reading pen may send out an audio about a story of "little tadpole looking for mother" when the area where the picture of "the little tadpole" is located, and may send out an audio about a story of "three little pigs" when the area where the picture of "the pig" is located.

However, the story machine with a point-reading function can only be triggered to send out an audio by manually grasping the story machine, so the story machine is not vivid and needs manual assistance.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a story machine that includes circuitry configured to detect movement indication information for indicating a first movement path of the story machine; control the story machine to move along the first movement path based on the detected movement indication information; detect play indication information for indicating multimedia information; control the story machine to stop moving in response to detecting the play indication information; and play the multimedia information based on the detected play indication information.

According to an aspect, the circuitry is further configured to acquire a second movement path associated with the detected play indication information; and control the story machine to move along the second movement path away from a position where the play indication information is detected after the multimedia information has been played.

In an example, the story machine further comprises a bearing portion, a roller, and a driving structure, wherein the circuitry of the story machine is fixed on the bearing portion, and the roller is provided below the bearing portion, and the driving structure is provided inside the bearing portion and is connected to the circuitry and the roller.

In another example, the movement indication information and the play indication information are stored in a two-dimensional code that is provided in a preset map paper, and the circuitry is configured to detect the movement indication information via a two-dimensional code scanning component.

In yet another example, the movement indication information is information sent by wireless signal positioning points arranged in an array, the play indication information is stored in a two-dimensional code, the wireless signal positioning points arranged in the array and the two-dimensional code are provided in a preset map paper, and the wireless signal positioning points are arranged around the two-dimensional code, and the circuitry is configured to detect the movement indication information via a two-dimensional code scanning component and a wireless signal receiving component.

In yet another example, the two-dimensional code is an invisible two-dimensional code.

According to an aspect, the circuitry is further configured to communicate with a terminal or a server.

Aspects of the disclosure also provide a story player system that includes the aforementioned story machine. The story player system includes at least one map paper, each being provided with a two-dimensional code, or each being provided with wireless signal positioning points arranged in an array and a two-dimensional code.

Aspects of the disclosure also provide a method for controlling a story machine. The method includes detecting movement indication information for indicating a first movement path of the story machine; controlling the story machine to move along the first movement path based on the detected movement indication information; detecting play indication information for indicating multimedia information; controlling the story machine to stop moving in response to detecting the play indication information; and playing the multimedia information based on the detected play indication information.

Aspects of the disclosure also provide a device for controlling a story machine. The device includes a processor and a memory configured to store instructions executable by the processor. The processor is configured to detect movement indication information for indicating a first movement path of the story machine; control the story machine to move along the first movement path based on the detected movement indication information; detect play indication information for indicating multimedia information; control the story machine to stop moving in response to detecting the play indication information; and play the multimedia information based on the detected play indication information.

Aspects of the disclosure also provide a non-transitory computer-readable storage medium storing instructions that, when executed by one or more processors of a computing device, cause the computing device to implement the aforementioned method for controlling the story machine.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
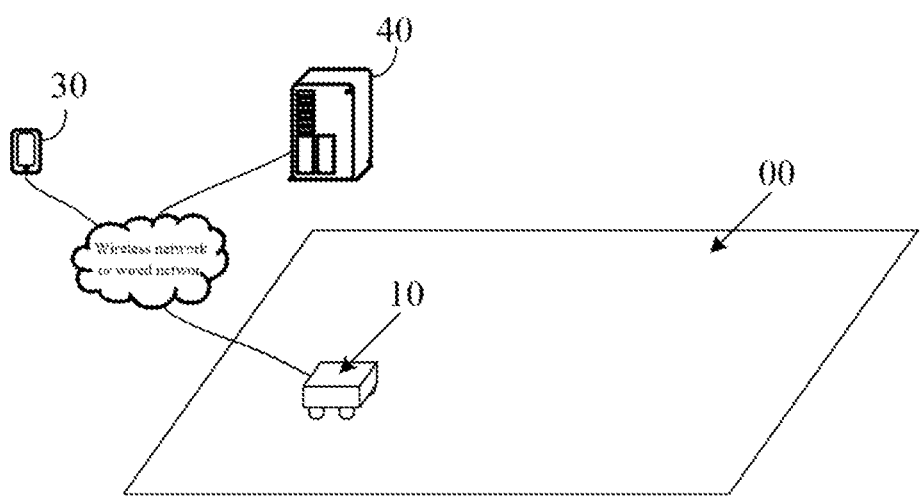
FIG. 1 is a diagram illustrating an application scenario for a story machine in accordance with an exemplary aspect of the present disclosure.

Referring now to FIG. 1, which shows a schematic diagram of an application scenario for a story machine player system provided in an aspect of the present disclosure. The story machine player system may include a story machine 10 which may move automatically and play multimedia information.

In Some aspects, the story machine player system may further include a special floor. The story machine 10 may move automatically on a map paper 00 after being placed on the special floor. Alternatively, the story machine 10 may play multimedia information at a position on the special floor.

Alternatively, the story machine player system may further include at least one map paper 00. The story machine 10 may move automatically on the map paper 00 after being placed on the map paper. Alternatively, the story machine 10 may play multimedia information at a position on the map paper 00. Exemplarily, the map paper 00 may be a large foldable paper product. The map paper 00 may also be a page-turnable book, and in this case, the contents of the map paper in different pages are different.

In Some aspects, the story machine player system may further include a terminal 30 and/or a server 40. The terminal 30 may be a smart phone, a computer, a multimedia player, a wearable device, a smart TV, or the like. The server 40 may be a server, or a server cluster consisting of a plurality of servers, or a cloud computing service center. The terminal 30 and the story machine 10 may be connected through a wired network or a wireless network. The server 40 and the story machine 10 may be connected through a wired network or a wireless network.

Figure 2:
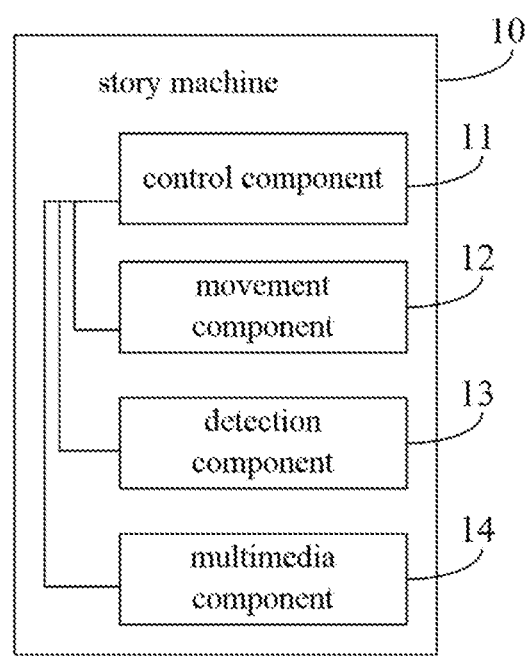
FIG. 2 is a block diagram illustrating a story machine in accordance with an exemplary aspect of the present disclosure.

A story machine is provided in an aspect of the present disclosure. Referring to FIG. 2, which shows a block diagram of a story machine 10 provided in an aspect of the present disclosure. The story machine 10 may include:

a control component 11, a movement component 12, a detection component 13 and a multimedia component 14.

The movement component 12, the detection component 13 and the multimedia component 14 are all electrically connected to the control component 11. The control component 11 is configured to, at every time when the detection component 13 detects movement indication information for indicating a first movement path of the story machine, control the movement component 12 to move along the first movement path in accordance with the movement indication information, until the detection component 13 detects play indication information for indicating multimedia information, and control the movement component 12 to stop moving. The control component 11 is further configured to, when the detection component 13 detects the play indication information, control the multimedia component 14 to play the multimedia information according to the detected play indication information.

In summary, according to the story machine provided in the aspects of the present disclosure, after the movement indication information for indicating the first movement path of the story machine is detected, the story machine may move along the first movement path until the play indication information for indicating the multimedia information is detected, and then the story machine stops moving and plays the multimedia information. Therefore, the story machine may move automatically and play the multimedia information. The story machine may play the multimedia information without manual assistance, thus making the story machine more vivid.

Figure 3A:
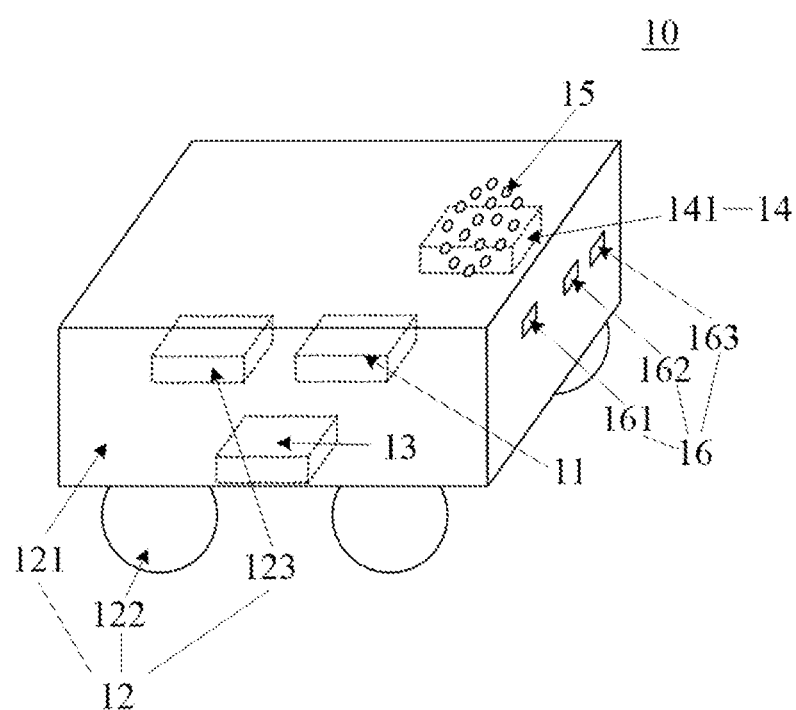
FIG. 3A is a structural diagram illustrating a story machine in accordance with an exemplary aspect of the present disclosure.

In some aspects, referring to FIG. 3A, which is a structural diagram of a story machine 10 provided in an aspect of the present disclosure. The movement component 12 in the story machine 10 may include a bearing portion 121, a roller 122, and a driving structure 123. The detection component 13, the multimedia component 14 and the control component 11 are all fixed on the bearing portion 121. The roller 122 is provided below the bearing portion 121. The driving structure 123 is provided inside the bearing portion 121, and is connected to the control component 11 and the roller 122. In some aspects, the driving structure 123 may be a driving motor. The control component 11 may control the driving motor to work according to movement indication information, and then the driving motor drives the roller 122 to roll, such that the story machine 10 moves along a first movement path. In practical applications, the bearing portion 121 may be a housing, the detection component 13 is fixed on the bottom of the housing, and the multimedia component 14 and the control component 11 are located inside the housing. Generally, the housing may include an upper housing and a lower housing. The lower housing may include an open surface. The detection component 13 is fixed on the bottom of the lower housing. The multimedia component 14 and the control component 11 are provided inside the lower housing through the open surface. The upper housing may be provided at the open surface of the lower housing in a reversing manner to form an enclosed housing. The enclosed housing may be in a shape of a "rabbit", a "tiger", a "kid", or the like, which is not limited in the present disclosure.

In the aspect of the present disclosure, the multimedia information played by the multimedia component 14 may be audio information. Here, the multimedia component 14 may include an audio player 141. The story machine 10 may further include a sound amplification hole 15 through which the audio information may be transmitted when the audio player plays the audio information. In practical applications, the multimedia information played by the multimedia component 14 may also be video information which may include image information and audio information. Here, please refer to FIG. 3B which is a structural diagram of another story machine 10 provided in an aspect of the present disclosure. The multimedia component 14 may further include an image display 142. When the multimedia component 14 plays video information, the image display 142 may display the image information. The audio information played by the audio player 141 may be transmitted through the sound amplification hole 15.

Figure 3B:
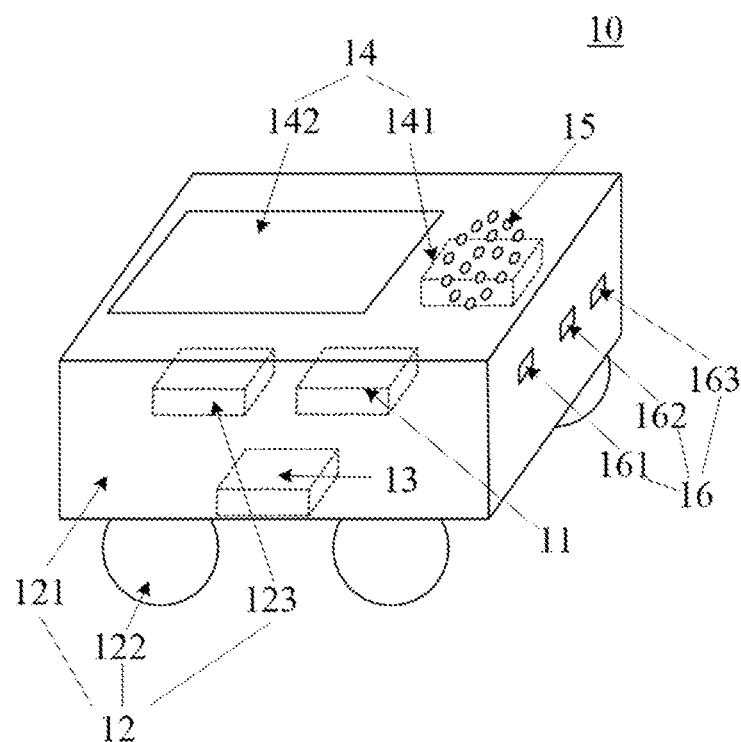
FIG. 3B is a structural diagram illustrating another story machine in accordance with an exemplary aspect of the present disclosure.

In some aspects, as shown in FIG. 3A or FIG. 3B, the story machine 10 may further include a plurality of control buttons 16. The plurality of control buttons 16 may include a switch button 161, a volume adjustment button 162, and a mode switching button 163. Exemplarily, the story machine 10 may have a plurality of play modes. Play parameters corresponding to the plurality of play modes are different from each other. For example, the play parameters may include timbre, tone background sound, and the like. For example, it is assumed that the play parameter is the timbre, the play mode of the story machine may be a mode of playing with the timbre of a "boy" or a mode of playing with the timbre of a "girl". The current play mode of the story machine may be switched by the mode switching button 163.

In some aspects, the story machine may also include a communication component which is electrically connected to the control component and is configured to communicate with a terminal or a server. When the communication component communicates with the server, the story machine may acquire multimedia information from the server. When the communication component communicates with the terminal, the story machine may be controlled through the terminal. Exemplarily, the terminal may be a mobile phone. In this case, the communication component in the mobile phone establishes a communication relationship with the communication component in the story machine. Software for controlling the story machine installed in the mobile phone may remotely control the story machine to be turned on or turned off, and may also remotely control the volume of the multimedia information played by the story machine.

In practical applications, when operating the software for controlling the story machine, the mobile phone may display a selection list for adjusting the play mode in which identifiers of all play modes supported by the story machine are recorded. The identifiers of the play modes supported by the story machine may be stored in the story machine in advance. The play modes stored in the story machine in advance may be modes of playing with different timbres, modes of playing with different tones, modes of playing with different background music, or the like. When the identifier of one of the play modes in the selection list for adjusting the play mode displayed on the mobile phone is triggered, the story machine may be remotely controlled to switch to the play mode corresponding to the play mode identifier. Exemplarily, when the story machine plays the multimedia information of "little tadpole looking for mother", the current play mode of the story machine may be a mode of playing with the timbre of "little tadpole". When the identifier of the play mode of "frog" in the selection list for adjusting the play mode displayed on the mobile phone is triggered, the current play mode of the story machine may be switched to a mode of playing with the timbre of "frog". It should be noted that the play modes supported by the story machine may be updated regularly. For example, the mobile phone may acquire information of some play modes from the corresponding server and update, through the communication component, the play modes stored in the story machine. Alternatively, the story machine may directly acquire information of some play modes from the corresponding server, and synchronize, through the communication component, the acquired information to the mobile phone connected to the story machine.

In the aspect of the present disclosure, when the detection component in the story machine detects the movement indication information for indicating a first movement path of the story machine, the story machine may move along the first movement path. When the detection component in the story machine detects play indication information, the story machine may stop moving and play the multimedia information. Generally, the story machine may be used with a map paper. In this case, the movement indication information and the play indication information may be recorded in the map paper, such that the story machine may automatically move on the map paper after detecting the movement indication information in the map paper and may play the multimedia information after detecting the play indication information in the map paper. As the scanning component in the story machine may only scan the play indication information after the multimedia information is played, in order to allow the story machine to continue to move after the multimedia information is played, the control component in the story machine is further configured to acquire a second movement path associated with the detected play indication information. After the multimedia component plays the multimedia information, the movement component is controlled to move along the second movement path away from the position where the play indication information is detected.

In practical applications, there are many kinds of movement indication information recorded in the map paper, and thus the story machine may automatically move on the map paper in many ways. The aspect of the present disclosure is schematically illustrated by taking the following two possible implementations as examples.

Figure 4A:
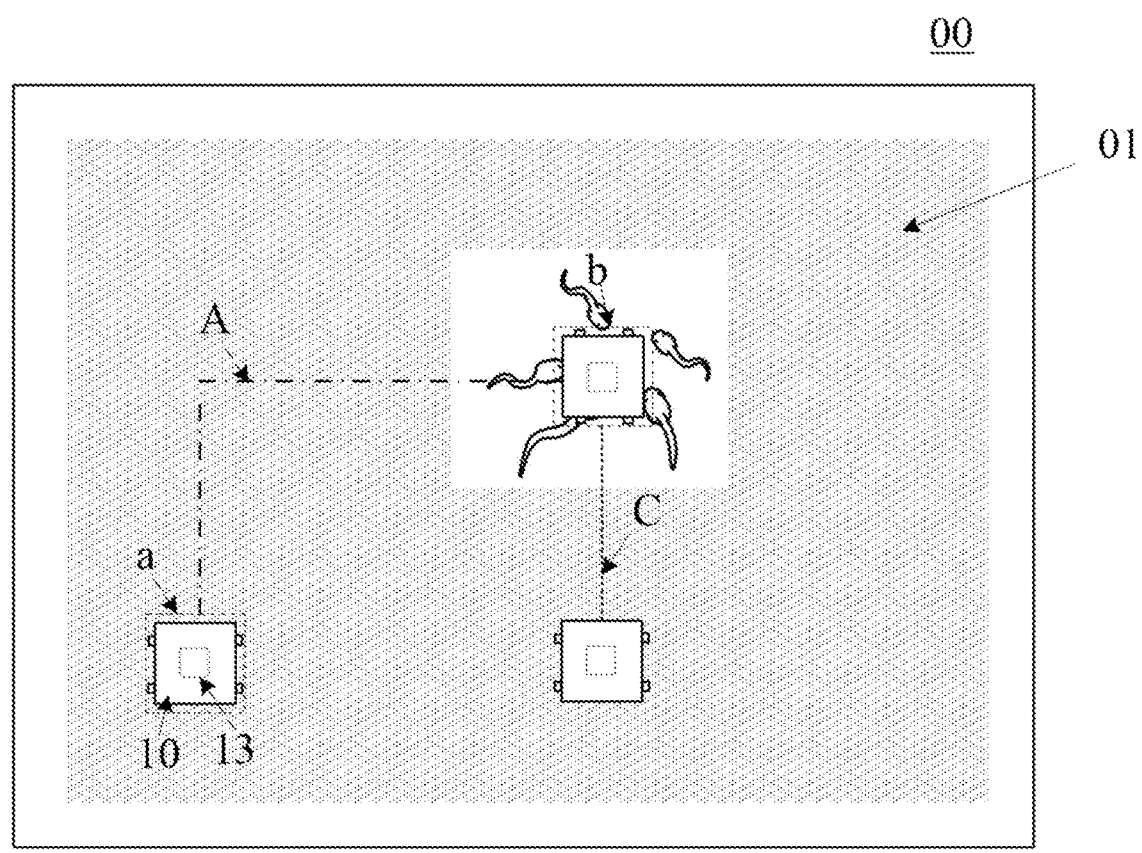
FIG. 4A is a structural diagram illustrating a map paper in accordance with an exemplary aspect of the present disclosure.

In the first possible implementation, please refer to FIG. 4A, which is a schematic structural diagram of a map paper provided in an aspect of the present disclosure. The movement indication information and the play indication information are stored in a two-dimensional code 01. The two-dimension code 01 is provided in a preset map paper 00. In this case, the detection component in the story machine may be a two-dimensional code scanning component. In some aspects, the two-dimensional code 01 may be a two-dimensional code visible to naked eyes, or an invisible two-dimensional code invisible to naked eyes. Both the two-dimensional code visible to naked eyes and the invisible two-dimensional code may store a large amount of information (for example, the movement indication information and the play indication information). The invisible two-dimensional code is arranged on the map paper using a colorless invisible material (such as fluorescent ink, fluorescent carbon powder, fluorescent ribbon and infrared ink) by printing. In general, the map paper 00 also needs to be printed with a pattern visible to naked eyes. For example, the map paper may be printed with a "little tadpole" pattern. In order not to affect the user's experience of viewing the pattern on the map paper 00, the two-dimensional code 01 may be set as an invisible two-dimensional code. In this case, the user may only see the pattern printed on the map paper. The invisible two-dimensional code may be recognized by the two-dimensional code scanning component in the story machine.

It should be noted that there may be a plurality of two-dimensional codes 01 on the map paper 00, and the area of each two-dimensional code 01 needs to be smaller than the scanning area of the two-dimensional code scanning component, thereby ensuring that the two-dimensional code scanning component may recognize a two-dimensional code 02. The plurality of two-dimensional codes 01 may form a two-dimensional code area. The two-dimensional code area generally needs to cover the entire map paper 00, such that the story machine may recognize the two-dimensional code 01 at any position on the map paper 00, thereby ensuring that the story machine may be controlled to move or play the multimedia information at any position on the map paper 00.

In the aspect of the present disclosure, when the story machine 10 is on the map paper 00 shown in FIG. 4A, assuming that the story machine 10 is at a position a of the map paper 00, the detection component 13 in the story machine 10 detects that the information stored in the two-dimensional code 01 is movement indication information, wherein the corresponding relationship between the movement indication information and the first movement path may be stored in advance in the story machine 10 locally (for example, a local database of the story machine), then the control component in the story machine 10 may obtain a first movement path A corresponding to the movement indication information at the position a from the corresponding relationship between the movement indication information and the first movement path. In the aspect of the present disclosure, the first movement path may be generally characterized by a movement direction and a movement distance. For example, the first movement path A may be: moving forwards by 5 cm and then moving rightwards by 5 cm. In this case, the control component in the story machine 10 may control the story machine 10 to move forwards by 5 cm and then control the story machine 10 to move rightwards by 5 cm. During the movement of the story machine 10, the control component may control the detection component 13 to be turned off. On the one hand, the story machine 10 may be prevented from continuously detecting other two-dimensional codes in the map paper 10 during the movement to avoid movement chaos. On the other hand, the energy consumption of the detection component may be saved.

After the story machine 10 moves along the first movement path A, the control component in the story machine 10 needs to control the detection component 13 to be turned on. Assuming that the detection component 13 in the story machine 10 detects that the information stored in the two-dimensional code 01 is play indication information when the story machine 10 moves to a position b in the map paper 00, wherein the corresponding relationship between the play indication information and the multimedia information may be stored in the story machine 10 locally in advance, then the control component in the story machine 10 may obtain the multimedia information corresponding to the play indication information at the position b from the corresponding relationship between the play indication information and the multimedia information to further control the multimedia component to play the multimedia information. Exemplarily, the map paper 00 may be printed with a pattern. For example, a pattern of "little tadpole" may be printed at the position b, and then the story machine 10 may play the multimedia information of "little tadpole looking for mother" at the position b.

It should be noted that, the corresponding relationship between the multimedia information and the second movement path may also be stored in the story machine 10 locally in advance. After the control component in the story machine 10 acquires the multimedia information, the control component may also obtain a second movement path C corresponding to the multimedia information acquired by the control component from the corresponding relationship between the multimedia information and the second movement path, such that the control component may control the story machine 10 to move along the second movement path C after the story machine 10 plays the multimedia information. In the aspect of the present disclosure, the second movement path may also be characterized by a movement direction and a movement distance. The way of characterizing the second movement path is the same as the way of characterizing the first movement path, and will not be described herein again.

It should also be noted that the above aspect is illustrated by taking an example in which the corresponding relationship between the play indication information and the multimedia information, the corresponding relationship between the movement indication information and the first movement path, and the corresponding relationship between the multimedia information and the second movement path are stored in the story machine locally. In practical applications, the corresponding relationship between the play indication information and the multimedia information, the corresponding relationship between the movement indication information and the first movement path, and the corresponding relationship between the multimedia information and the second movement path may also be stored in a server. The location whereof the information is stored will not be limited in the aspect of the present disclosure.

Figure 4B:
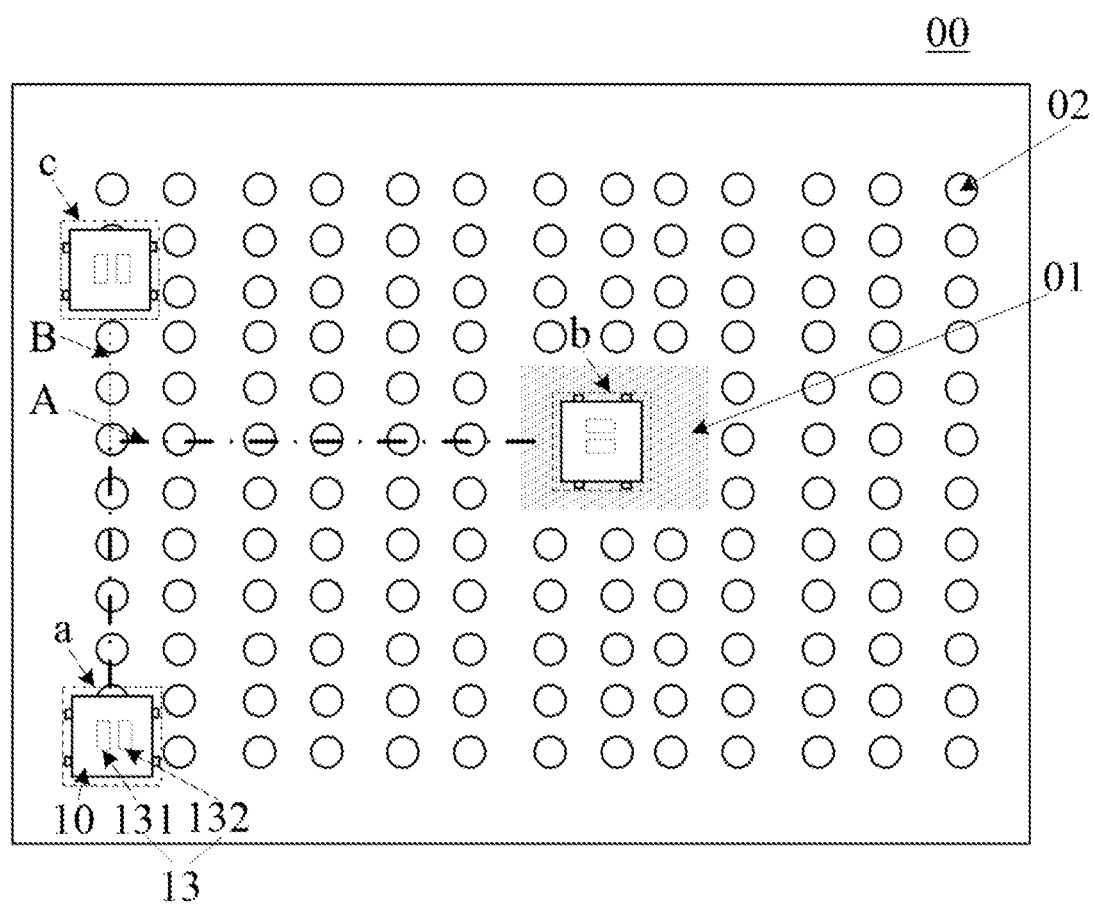
FIG. 4B is a structural diagram illustrating another map paper in accordance with an exemplary aspect of the present disclosure.

In the second possible implementation, please refer to FIG. 4B, which is a schematic structural diagram of another map paper provided in an aspect of the present disclosure. The movement indication information is information sent by wireless signal positioning points 02 arranged in an array, and the play indication information is stored in a two-dimensional code 01. It should be noted that the two-dimensional code in the second possible implementation is similar to the two-dimensional code in the first possible implementation, and will not be described herein again. The wireless signal positioning points 02 arranged in an array and the two-dimensional code 01 are provided in a preset map paper 00, and the wireless signal positioning points 02 are arranged around the two-dimensional code 01. The area formed by the two-dimensional code 01 and the wireless signal positioning points usually needs to cover the entire map paper 00. In this case, the detection component 13 in the story machine may include a two-dimensional code scanning component 131 and a wireless signal receiving component 132. The two-dimensional code 01 may be acquired by the two-dimensional code scanning component 131. In some aspects, the wireless signal receiving component 132 may acquire the position information of the story machine 10 in the map paper 00. The control component in the story machine 10 may generate a first movement path according to the position information of the story machine 10 in the map sheet 00.

Exemplarily, the corresponding relationship between the position information of the story machine in the map paper and the first movement path may be stored in the story machine 10 locally in advance. When the story machine 10 is located on the map paper 00 shown in FIG. 4B, the position a of the story machine 10 in the map paper 00 may be obtained by the wireless signal receiving component 132. The control component in the story machine 10 may obtain the corresponding first path A of the story machine at the position a from the corresponding relationship between the position information of the story machine in the map paper and the first movement path, such that the control component may control the story machine 10 to move along the first movement path A. During the movement of the story machine 10, in order to ensure that the story machine 10 may move along the first movement path A, it is necessary to ensure that the story machine 10 sequentially passes through the wireless signal positioning points 02 covered by the first path A. Therefore, the wireless signal receiving component 132 needs to be continuously turned on. When the story machine 10 deviates from the first movement path A, the wireless signal receiving component 132 may reposition a deviation position c of the story machine 10 and regenerate a regression path B according to the deviation position c. After moving along the regression path B, the story machine 10 may move along the first path A again. It should be noted that the manner for playing the multimedia information in the second possible implementation may be the same as the manner for playing the multimedia information in the first possible implementation and will not be described again in the aspect of the present disclosure.

It should be noted that the above aspect is illustrated schematically by taking the case where the corresponding between the position information of the story machine in the map paper and the first movement path is stored in the story machine locally as an example. In practical applications, the corresponding relationship between the position information of the story machine in the map paper and the first movement path may also be stored in a server. The location wherein the information is stored will not be limited in the aspect of the present disclosure.

Figure 4C:
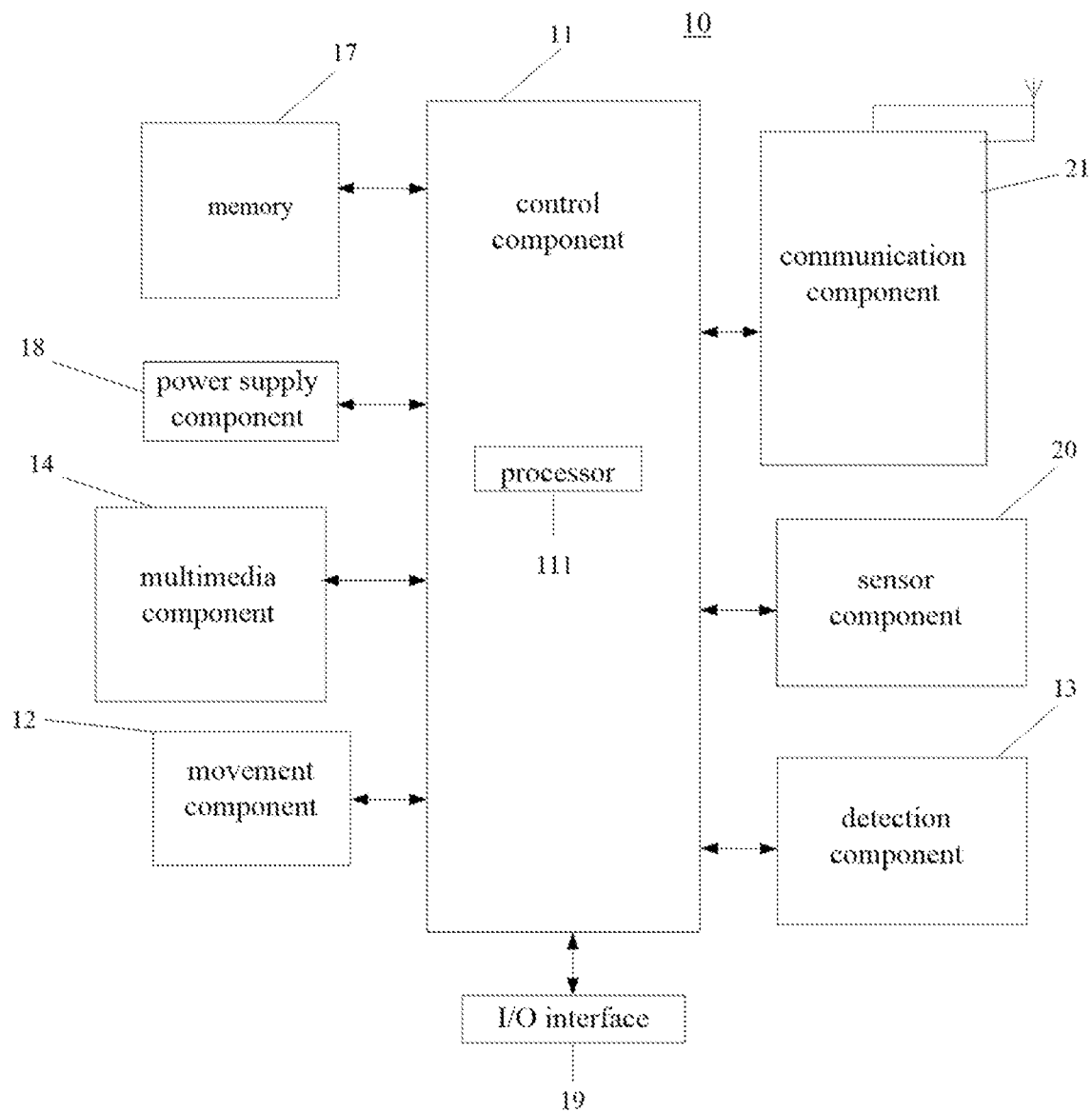
FIG. 4C is a block diagram illustrating another story machine in accordance with an exemplary aspect of the present disclosure.

Please refer to FIG. 4C, which shows a block diagram of another story machine 10 provided in an aspect of the present disclosure. The story machine 10 may include one or more of the following components: a control component 11, a movement component 12, a detection component 13, a multimedia component 14, a memory 17, a power supply component 18, an input/output (I/O) interface 19, a sensor component 20, and a communication component 21.

The control component 11 generally may control the overall operation of the story machine 10, such as operations associated with display, and data communication recording operation. The control component 11 may include one or more processors 111 to execute instructions, to complete all or part of the steps described above. In addition, the control component 11 may include one or more modules to facilitate the interactions between the control component 11 and other components. For example, the control component 11 may include a multimedia module to facilitate interaction between the multimedia component 14 and the control component 11.

The memory 17 may be configured to store various types of data to support the operation of the story machine 10. Examples of such data may include instructions of any application or method operating on the story machine 10, messages, pictures, videos, and the like. The memory 17 may be implemented by any type of volatile or nonvolatile memory device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or CD.

The power supply component 18 may provide power to the various components of the story machine 10. The power supply component 18 may include a power management system, one or more power supplies, and other components associated with generating, managing, and distributing power for the story machine 10.

The multimedia component 14 may include a screen providing an output interface between the story machine 10 and the user. In some aspects, the screen may include a liquid crystal display (LCD) and a touch panel (TP). If the screen includes a touch panel, the screen may be implemented as a touch screen to receive input signals from the user. The touch panel may include one or more touch sensors to sense touches, slides, and gestures on touch panels. The touch sensors may sense not only the boundary of the touch or slide actions, but also the duration and pressure associated with the touch or slide operation. The multimedia component 14 may further include a loudspeaker configured to output audio signals.

The I/O interface 19 may provide the interface between the control component 11 and a peripheral interface module. The peripheral interface module may be a keyboard, a mouse, a button, or the like. The button may include, but is not limited to, a home button, a volume button, a start button, and a lock button.

The sensor component 20 may include one or more sensors for providing condition assessments of the various aspects of the story machine 10. For example, the sensor component 20 may detect the on/off state of the story machine 10, the relative positioning of the components, such as the components may be the display and keypad of the story machine 10, and the sensor component 20 may also detect position changes of the story machine 10 or any component thereof, presence or absence of the user contact with the story machine 10, orientation, acceleration/deceleration of the story machine 10. The sensor component 20 may include a proximity sensor configured to detect the presence of a nearby object without any physical contact. The sensor component 20 may also include a light sensor, such as a CMOS or CCD image sensor, for imaging applications. In some aspects, the sensor component 20 may also include acceleration sensors, gyro sensors, magnetic sensors, pressure sensors, or temperature sensors.

The communication component 21 may be configured to facilitate wired or wireless communication between the story machine 10 and other devices. The story machine 10 may access a wireless network based on a communication standard, such as WiFi, 2G or 3G or a combination thereof. In an exemplary aspect, the communication component 21 may receive broadcast signals or broadcast-related information from an external broadcast management system via broadcast channels. In an exemplary aspect, the communication component 21 may also include a near field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology and other techniques.

In an exemplary aspect, the story machine 10 may be implemented by one or more application specific integrated circuits (ASICs), digital signal processors (DSPs), digital signal processing devices (DSPDs), programmable logic devices (PLDs), field programmable gate array (FPGA), a controller, a microcontroller, a microprocessor, or other electronic components for performing the method for controlling the story machine described below.

Persons of ordinary skill in the art may clearly understand that, for convenience and conciseness of description, the specific process for controlling the story machine described above may be made reference to the corresponding process in the following aspect of the method for controlling the story machine, which is not described again.

In summary, according to the story machine provided in the aspects of the present disclosure, after the movement indication information for indicating the first movement path of the story machine is detected, the story machine may move along the first movement path until the play indication information for indicating the multimedia information is detected, and then the story machine stops moving and plays the multimedia information. Therefore, the story machine may move automatically and play the multimedia information. The story machine may play the multimedia information without manual assistance, thus making the story machine more vivid.

An aspect of the present disclosure further provides a story machine play system. The story machine play system may include a story machine which may be the story machine shown in FIG. 3A or FIG. 3B. In some aspects, the story machine may further include at least map paper, each of which may be the map paper shown in FIG. 4A or FIG. 4B. In some aspects, the story machine play system may further include a terminal and/or a server. The structure of the story machine play system may be made reference to FIG. 1. It should be noted that the movement indication information recorded in different map papers may be different, and the play indication information recorded in different map papers may also be different, such that the story machine may move along different paths in different map papers, and the multimedia information played on different map papers may be different.

For example, the method for operating the story machine play system may be described by taking an example in which a user uses the story machine play system in the aspect of the present disclosure: the user may turn on the story machine and place the story machine at a position on the map paper. Here, the story machine may move on the map paper when the story machine detects movement indication information. The story machine may play multimedia information when the story machine detects play indication information. The user may use the volume adjustment button in the story machine to adjust the volume when the story machine plays the multimedia information, and use the mode switching button in the story machine to switch the current play mode of the story machine. Alternatively, the user may use the terminal that establishes a communication connection with the story machine to adjust the volume when the story machine plays the multimedia information, and to switch the current play mode of the story machine.

An aspect of the present disclosure further provides a method for controlling a story machine. Please refer to FIG. 5, which show a method for controlling a story machine provided in an aspect of the present disclosure. The method may be applied to the application scenario shown in FIG. 1. The method may include the following steps.

In step 501, at every time movement when indication information for indicating a first movement path is detected, the story machine is controlled to move along the first movement path in accordance with the movement indication information, until play indication information for indicating multimedia information is detected, and then the story machine is controlled to stop moving.

In step 502, the story machine is controlled to play the multimedia information according to the detected play indication information when the play indication information is detected.

In summary, according to the method for controlling the story machine provided in the aspects of the present disclosure, after the movement indication information for indicating the first movement path of the story machine is detected, the story machine may move along the first movement path until the play indication information for indicating the multimedia information is detected, and then the story machine stops moving and plays the multimedia information. Therefore, the story machine may move automatically and play the multimedia information. The story machine may play the multimedia information without manual assistance, thus making the story machine more vivid Please refer to FIG. 6A, which is a flowchart of a method for controlling another story machine provided in an aspect of the present disclosure. The method for controlling the story machine may be applied to the application scenario shown in FIG. 1. The method may be performed by the control component of the story machine. The method may include the following steps.

In step 601, at every time when movement indication information for indicating a first movement path of the story machine is detected, the story machine is controlled to move along the first movement path in accordance with the movement indication information, until play indication information for indicating multimedia information is detected, and then the story machine is controlled to stop moving.

Exemplarily, the story machine may generally be placed on a map paper in which movement indication information and play indication information may be recorded. The story machine may move along the first path when detecting the movement indication information. The story machine may stop moving when detecting the play indication information and perform step 602.

Figure 6A:
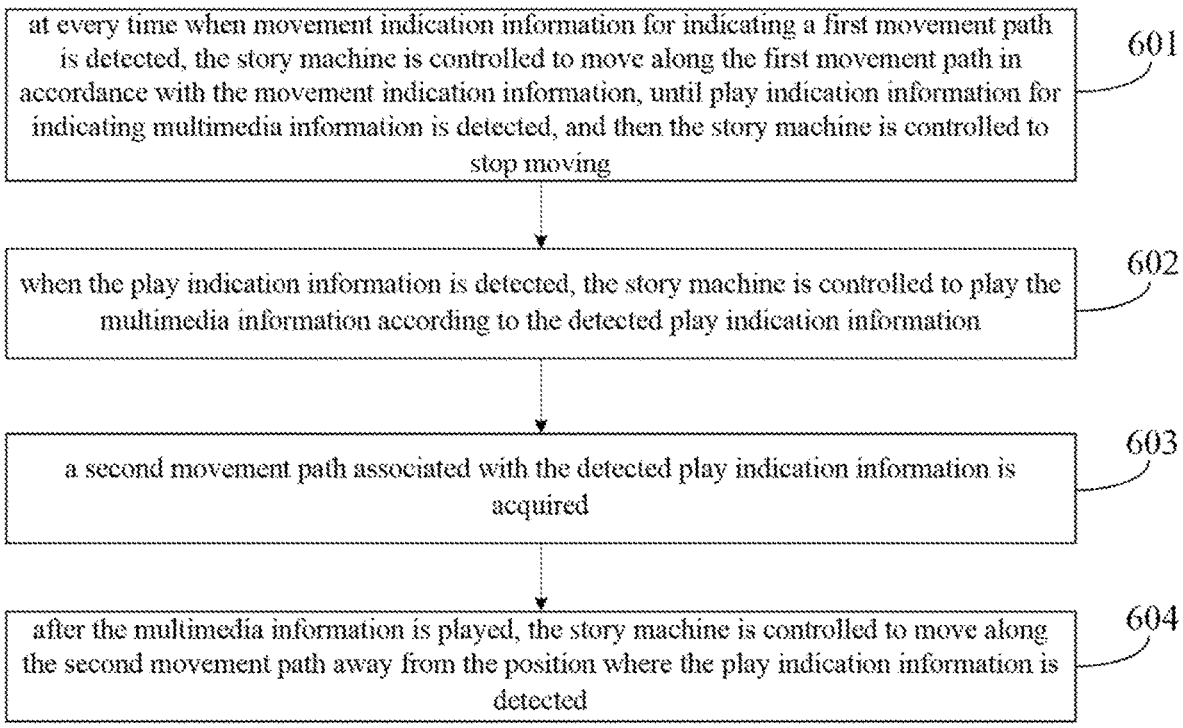
FIG. 6A is a flowchart illustrating a control method for another story machine in accordance with an exemplary aspect of the present disclosure.
Figure 6B:
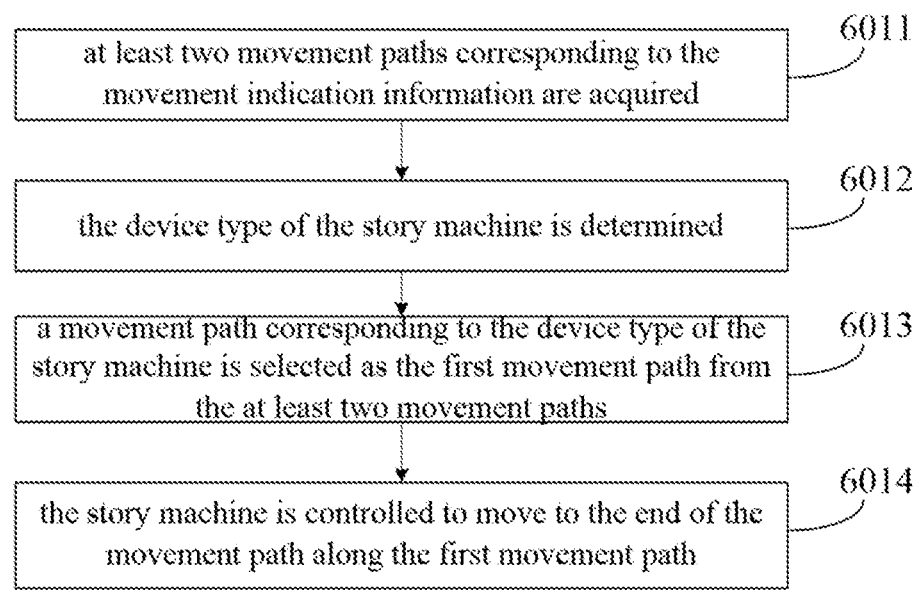
FIG. 6B is a flowchart illustrating a method for controlling a story machine to move along with a first movement path in accordance with an exemplary aspect of the present disclosure.

In the aspect of the present disclosure, please refer to FIG. 6B, which is a flowchart of a method for controlling the story machine to move along the first movement path provided in the aspect of the present disclosure, the method may include the following steps.

In step 6011, at least two movement paths corresponding to the movement indication information are acquired.

Here, each movement path corresponds to a device type. In the aspect of the present disclosure, the device type is known as a device category. There may be a plurality of ways to divide the device type. The device type of the story machine may be distinguished according to the shape of the story machine, or according to the type of multimedia played. For example, when the multimedia information played by the story machine is audio information, it may correspond to a story machine of one device type. When the multimedia information played by the story machine is video information, it may correspond to a story machine of another device type.

In the aspect of the present disclosure, the movement paths of different types of story machines on the same map paper may be different. Therefore, the movement indication information may correspond to at least two movement paths. Each movement path corresponds to a type of story machine, so that different types of story machines may move along different movement paths.

In practical applications, there are many types of movement indication information recorded in the map paper. The aspect of the present disclosure is illustrated schematically by taking the following two possible implementations as examples.

In the first possible implementation, the movement indication information may be stored in a two-dimensional code. The story machine may detect the two-dimensional code by scanning the map paper after being placed on the map paper, and may further acquire at least two movement paths according to the two-dimensional code.

In the second possible implementation, the movement indication information may be information sent by wireless signal positioning points arrange din an array. The story machine may detect a wireless positioning signal by scanning the map paper after being placed in the area of the map paper where the wireless signal positioning points are, and may further determine the position of the story machine in the map paper according to the scanned wireless positioning signal and acquire at least two movement paths according to the position of the story machine in the map paper.

In step 6012, the device type of the story machine is determined.

In step 6013, a movement path corresponding to the device type of the story machine is selected as the first movement path from the at least two movement paths.

In the aspect of the present disclosure, after the device type of the story machine is determined, a movement path corresponding to the type of the story machine may be selected as the first movement path from at least two movement paths corresponding to the movement indication information.

In practical applications, the movement path of the story machine may be stored in the story machine locally or in a server.

Exemplarily, the corresponding relationship between the movement path of the story machine and the movement indication information may be stored in the story machine locally. In this case, after the story machine acquires the movement indication information, the movement path corresponding to the movement indication information may be directly acquired as the first migration path from the story machine locally by inquiring the corresponding relationship.

Exemplarily, the corresponding relationship between the movement path of the story machine and the movement indication information may also be stored in the server. In this case, the corresponding relationship between the type identifier and the movement path of the story machine may also be stored in the server. The story machine, after acquiring the movement indication information, may acquire the corresponding movement path as the first movement path from the server according to the type identifier of the story machine and the movement indication information.

In step 6014, the story machine is controlled to move to the end of the movement path along the first movement path.

In some aspects, the first movement path may be generally characterized by a movement direction and a movement distance. For example, the first movement path may be: moving rightwards by 10 cm and then moving forwards by 5 cm, and here the story machine may be controlled to move rightwards by 10 cm and then move forwards by 5 cm. In practical applications, the story machine may be provided with a positioning module configured to detect the movement direction and the movement distance of the story machine when the story machine moves, thereby ensuring that the story machine may move along the first movement path.

In the aspect of the present disclosure, during the movement along the designated first path, since the types of the movement indication information are different, the ways of controlling the story machine during the movement are also different.

Exemplarily, for the first possible implementation, that is, when the movement indication information is stored in the two-dimensional code, since the two-dimensional code generally covers the entire map paper or the central area of the map paper during the movement along the first path, in order to prevent the story machine from continuously detecting other two-dimensional codes in the map paper during the movement process to cause movement chaos, it is necessary to stop scanning the map paper until the story machine moves to the end of the first path, and then begin to scan the map paper. In this case, after the movement indication information is detected, the story machine is controlled to continue to move along the first path. After the play indication information is detected, the step 602 is performed.

For the second possible implementation, that is, when the movement indication information is information sent by wireless signal positioning points arranged in an array, in order to ensure that the story machine may move along the first movement path during the movement along the first path, it is necessary to ensure that the story machine sequentially passes through the wireless signal positioning points covered by the first path. Therefore, it is necessary to continuously scan the wireless positioning signals. When the story machine moves to the end of the designated movement path, the scanning of the map paper is stopped. In this case, the story machine may not receive the wireless signals any longer and may detect the play indication information. Step 602 is performed when the play indication information is detected, the scanning of the map paper continues when the play indication information is not detected.

In step 602, when the play indication information is detected, the story machine is controlled to play the multimedia information according to the detected play indication information.

In some aspects, the play indication information may be stored in a two-dimensional code. It should be noted that when the movement indication information is the information sent by the wireless signal positioning points arranged in an array, the wireless signal positioning points arranged in an array need to be arranged around the two-dimensional code.

Figure 6C:
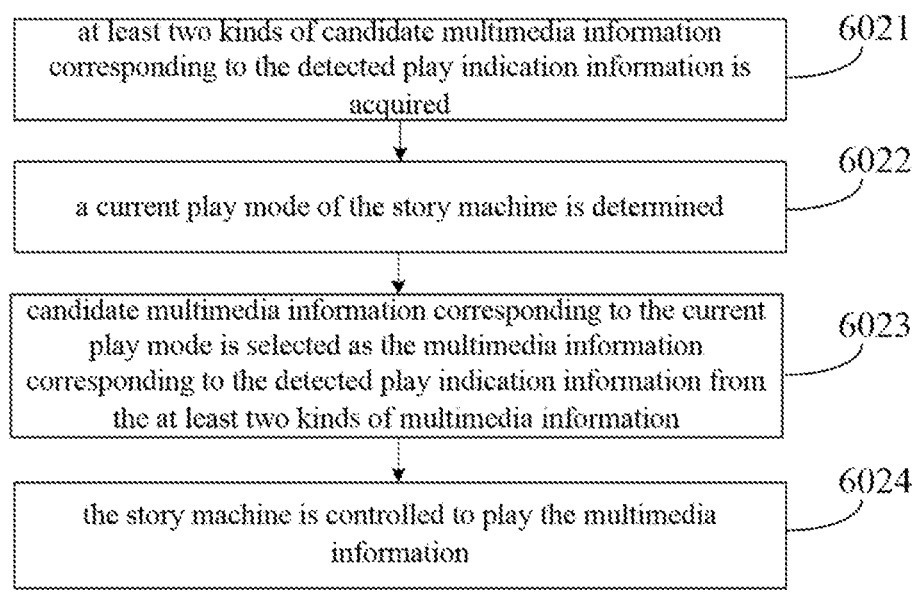
FIG. 6C is a flowchart illustrating a method for controlling a story machine to play multimedia information in accordance with an exemplary aspect of the present disclosure.

In the aspect of the present disclosure, please refer to FIG. 6C, which is a flowchart of a method for controlling the story machine to play the multimedia information provided in the aspect of the present disclosure. The method may include the following steps.

In step 6021, at least two kinds of candidate multimedia information corresponding to the detected play indication information is acquired.

Wherein, each type of candidate multimedia information corresponds to one play mode.

In the aspect of the present disclosure, the play modes of different types of story machines may be different. For example, when the story machine is in a shape of a "tiger", the play mode of the story machine is a mode of playing with a timbre of "Tiger". When the story machine is in a shape of a "rabbit", the play mode of the story machine is a mode of playing with a timbre of "rabbit". The play mode for the same story machine may be or may not be fixed. When the play mode of the story machine is not fixed, the story machine may have at least two play modes. The play parameters corresponding to the at least two play modes are different from each other. For example, when the play parameter is timbre, the play mode of the story machine may be a mode of playing with a timbre of a "boy" or a mode of playing with a timbre of a "girl".

In the step 6022, a current play mode of the story machine is determined.

In the aspect of the present disclosure, if the play mode of the same story machine is fixed, after the type of the story machine is determined, the current play mode of the story machine may be determined. If the play mode of the same story machine is not fixed, after the type of the story machine is determined, it is also necessary to determine the current play mode of the story machine from at least two play modes in the story machine. In practical applications, each play mode may correspond to a mode identifier. The current play mode of the story machine may be acquired by acquiring the current mode identifier of the story machine. The current mode identifier may be configured by a user in advance.

In the step 6023, candidate multimedia information corresponding to the current play mode is selected as the multimedia information corresponding to the detected play indication information from the at least two kinds of multimedia information.

In the aspect of the present disclosure, after the current play mode of the story machine is determined, the candidate multimedia information corresponding to the current play mode is selected as the multimedia information corresponding to the detected play indication information from the at least two kinds of multimedia information corresponding to the play indication information.

In practical applications, the multimedia information of the story machine may be stored in the story machine locally or in a server. In some aspects, the multimedia information may be audio information or video information.

Exemplarily, the corresponding relationship between the multimedia information and the play indication information may be stored in the story machine locally. In this case, for a story machine with a fixed play mode, the story machine, after acquiring the play indication information, may acquire the multimedia information corresponding to the play indication information directly from the story machine locally by inquiring the corresponding relationship. For a story machine with a variable play mode, the story machine, after acquiring the play indication information, may acquire at least two kinds of multimedia information corresponding to the play indication information from the story machine locally, then determine the current play mode of the story machine, and finally select the candidate multimedia information corresponding to the current play mode as the multimedia information corresponding to the detected play indication information from the at least two kinds of multimedia information.

Exemplarily, the corresponding relationship between the multimedia information and the play indication information may also be stored in a server. In this case, the corresponding relationship between the mode identifier of the story machine and the multimedia information may also be stored in the server. The story machine, after acquiring the play indication information, may acquire the corresponding multimedia information according to the current mode identifier of the story machine and the play indication information.

In step 6024, the story machine is controlled to play the multimedia information.

In step 603, a second movement path associated with the detected play indication information is acquired.

In the aspect of the present disclosure, after the story machine plays the multimedia information, as the story machine is at the position wherein the play indication information is in the map paper, the story machine may not acquire the movement indication information again. Therefore, in order to allow the story machine to continue to move after the multimedia information is played, the second movement path associated with the play indication information needs to be acquired when the detected play indication information is acquired in step 602.

In some aspects, as the multimedia information may be acquired according to the play indication information and as the multimedia information is stored locally or in a server, the corresponding relationship between the play indication information and the second movement path may be stored locally or in a server. When the detected play indication information is acquired, the corresponding relationship between the play indication information and the second movement path may be inquired locally or in the server to obtain the second movement path corresponding to the detected play indication information.

In step 604, after the multimedia information is played, the story machine is controlled to move along the second movement path away from the position where the play indication information is detected.

In the aspect of the present disclosure, during the movement along the designated second path, the ways of controlling the story machine during the movement are different as the types of the movement indication information are different.

Exemplarily, for the first possible implementation, that is, when the movement indication information is stored in a two-dimensional code, similarly, it's necessary to stop scanning the map paper until the story machine moves to the end of the second path, and then to continue to scan the map paper. In this case, after the movement indication information is detected, step 601 is performed. After the play indication information is detected, step 602 is performed.

For the second possible implementation, that is, when the movement indication information is the information sent by the wireless signal positioning points arranged in an array, similarly, it is necessary to continuously scan the wireless positioning signals during the movement along the second path and then stop scanning the map paper when the story machine moves to the end of the designated movement path. Here, the story machine may not receive the wireless signals any longer and may detect the play indication information. When the play indication information is detected, step 602 is performed. When the play indication information is not detected, the scanning of the map paper continues.

It should be noted that the order of the steps of the method for controlling the story machine provided in the aspects of the present disclosure may be adjusted appropriately, and the steps may also be added or deleted correspondingly according to circumstances. Within the technical scope disclosed by the present disclosure, any method that may be easily derived by a person skilled in the art shall fall within the protection scope of the present disclosure and will not be described in detail.

In summary, according to the method for controlling the story machine provided in the aspects of the present disclosure, after the movement indication information for indicating the first movement path of the story machine is detected, the story machine may move along the first movement path until the play indication information for indicating the multimedia information is detected, and then the story machine stops moving and plays the multimedia information. Therefore, the story machine may move automatically and play the multimedia information. The story machine may play the multimedia information without manual assistance, thus making the story machine more vivid.

Figure 7A:
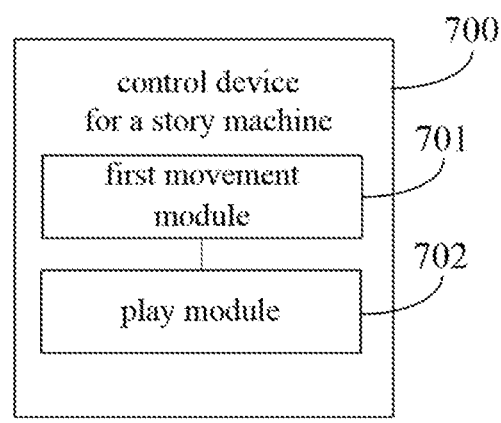
FIG. 7A is a block diagram illustrating a control device of a story machine in accordance with an exemplary aspect of the present disclosure.

An aspect of the present disclosure further provides a control device for a story machine. Please refer to FIG. 7A, which is a block diagram of a control device 700 for a story machine. The control device 700 for the story machine may include:

a first movement module 701 configured to, at every time when movement indication information for indicating a first movement path is detected, control the story machine to move along the first movement path in accordance with the movement indication information, until play indication information for indicating multimedia information is detected, and then control the story machine to stop moving; and a play module 702 configured to control the story machine to play the multimedia information according to detected play indication information when the play indication information is detected.

In summary, according to the control device for the story machine provided in the aspects of the present disclosure, after the movement indication information for indicating the first movement path of the story machine is detected, the story machine may move along the first movement path until the play indication information for indicating the multimedia information is detected, and then the story machine stops moving and plays the multimedia information. Therefore, the story machine may move automatically and play the multimedia information. The story machine may play the multimedia information without manual assistance, thus making the story machine more vivid.

Figure 7B:
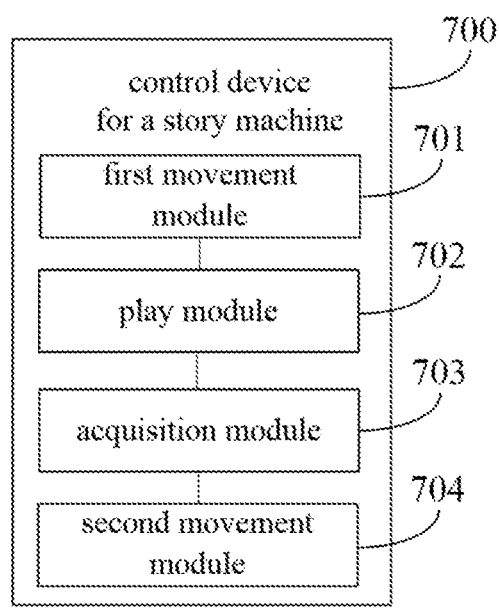
FIG. 7B is a block diagram illustrating a control device of another story machine in accordance with an exemplary aspect of the present disclosure.

In some aspects, please refer to FIG. 7B, which is a block diagram of a control device 700 for another story machine provided in an aspect of the present disclosure. The control device 700 for the story machine may further includes:

an acquisition module 703 configured to acquire a second movement path associated with the detected play indication information; and a second movement module 704 configured to, after the multimedia information is played, control the story machine to move along the second movement path away from a position where the play indication information is detected.

Figure 7C:
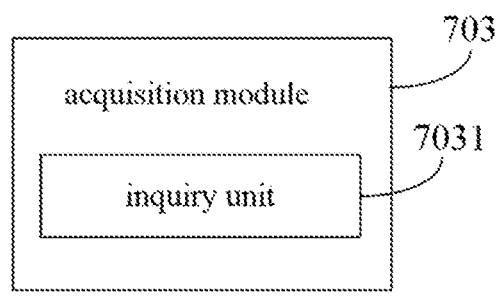
FIG. 7C is a block diagram illustrating an acquisition module in accordance with an exemplary aspect of the present disclosure.

In some aspects, please refer to FIG. 7C, which is a block diagram of an acquisition module 703. The acquisition module 703 may include:

an inquiry unit 7031 configured to inquire a preset corresponding relationship between the play indication information and movement path to obtain the second movement path corresponding to the detected play indication information.

Figure 7D:
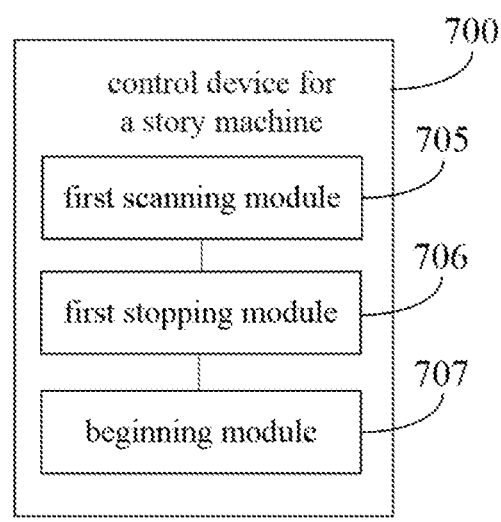
FIG. 7D is a block diagram illustrating a control device of yet another story machine in accordance with an exemplary aspect of the present disclosure.

In some aspects, please refer to FIG. 7D, which is a block diagram of a control device 700 for still another story machine provided in an aspect of the present disclosure. The movement indication information and the play indication information are stored in a two-dimensional code which is provided in a preset map paper. The control device 700 for the story machine may further include:

a first scanning module 705 configured to, after the story machine is placed on the map paper, scan the map paper to detect the two-dimensional code;

a first stopping module 706 configured to, in the process of every movement along a designated movement path, stop scanning the map paper, wherein the designated movement path is the first movement path or the second movement path; and a beginning module 707 configured to, once reaching the end of the designated movement path, begin to scan the map paper.

Figure 7E:
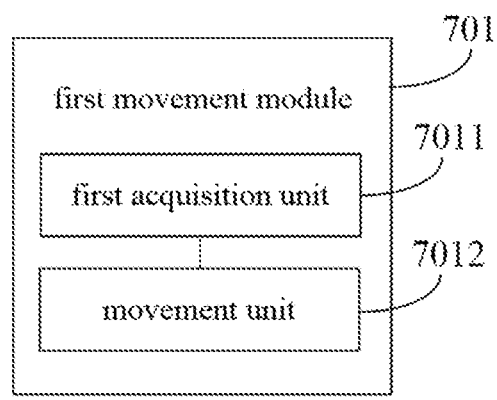
FIG. 7E is a block diagram illustrating a first movement module in accordance with an exemplary aspect of the present disclosure.
Figure 7F:
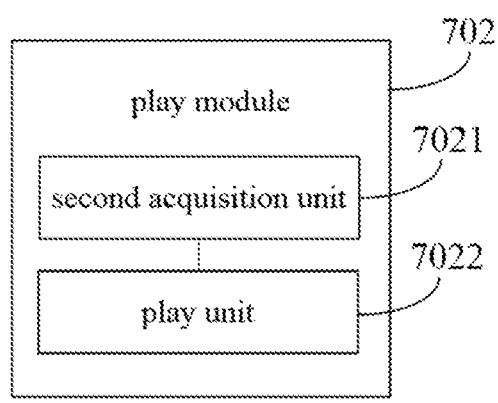
FIG. 7F is a block diagram illustrating a play module in accordance with an exemplary aspect of the present disclosure.

In some aspects, please refer to FIG. 7E and FIG. 7F. FIG. 7E is a block diagram of a first movement module 701 provided in an aspect of the present disclosure, and FIG. 7F is a block diagram of a play module 702 provided in an aspect of the present disclosure.

The first movement module 701 may include:

a first acquisition unit 7011 configured to acquire the first movement path according to the movement indication information; and a movement unit 7012 configured to control the story machine to move along the first movement path to the end of the movement path.

The play module 702 may include:

a second acquisition unit 7021 configured to acquire the multimedia information according with the detected play indication information; and a play unit 7022 configured to control the story machine to play the multimedia information.

In some aspects, the first acquisition unit 7011 is configured to acquire at least two movement paths corresponding to the movement indication information, each movement path corresponding to a device type; determine the device type of the story machine; and select the movement path corresponding to the device type of the story machine as the first movement path from the at least two movement paths.

In some aspects, the second acquisition unit 7021 is configured to acquire at least two kinds of candidate multimedia information corresponding to the detected play indication information, each of the candidate multimedia information corresponding to a play mode; determine a current play mode of the story machine; and select the candidate multimedia information corresponding to the current play mode as multimedia information corresponding to the detected play indication information from the at least two kinds of multimedia information.

Figure 7G:
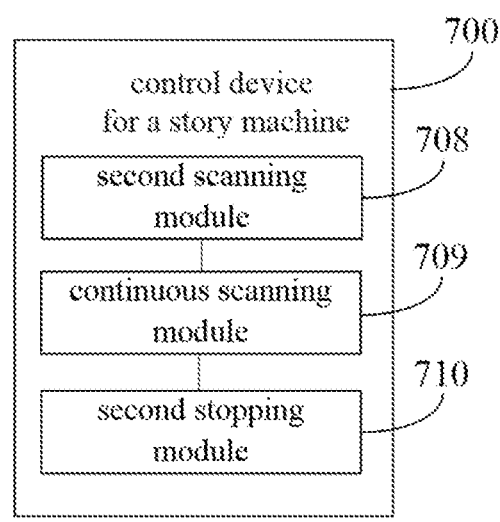
FIG. 7G is a block diagram illustrating a control device of still yet another story machine in accordance with an exemplary aspect of the present disclosure.

In some aspects, please refer to FIG. 7G, which is a block diagram of a control device 700 for still another story machine provided in an aspect of the present disclosure. The movement indication information is information sent by wireless signal positioning points arranged in an array, the play indication information is stored in a two-dimensional code, the wireless signal positioning points arranged in an array and the two-dimensional code are provided in a preset map paper, and the wireless signal positioning points are arranged around the two-dimensional code. The control device 700 further include:

a second scanning module 708 configured to, after the story machine is placed in an area of the map paper where the wireless signal positioning points are located, scan the map paper to detect the wireless positioning signals;

a continuous scanning module 709 configured to, in the process of every movement along a designated movement path, continuously scan the wireless positioning signals, wherein the designated movement path is the first movement path or the second movement path; and a second stopping module 710 configured to, once reaching the end of the designated movement path, stop scanning the map paper.

In some aspects, the second acquisition unit 7021 is configured to acquire the multimedia information locally or from a server according to the detected play indication information.

Persons of ordinary skill in the art may clearly understand that, for convenience and conciseness of description, the specific operating processes for the device, the modules and the units described above may be made reference to the corresponding process in the foregoing method aspects, which is not described again.

In summary, according to control device for the story machine provided in the aspects of the present disclosure, after the movement indication information for indicating the first movement path of the story machine is detected, the story machine may move along the first movement path until the play indication information for indicating the multimedia information is detected, and then the story machine stops moving and plays the multimedia information. Therefore, the story machine may move automatically and play the multimedia information. The story machine may play the multimedia information without manual assistance, thus making the story machine more vivid.

Figure 5:
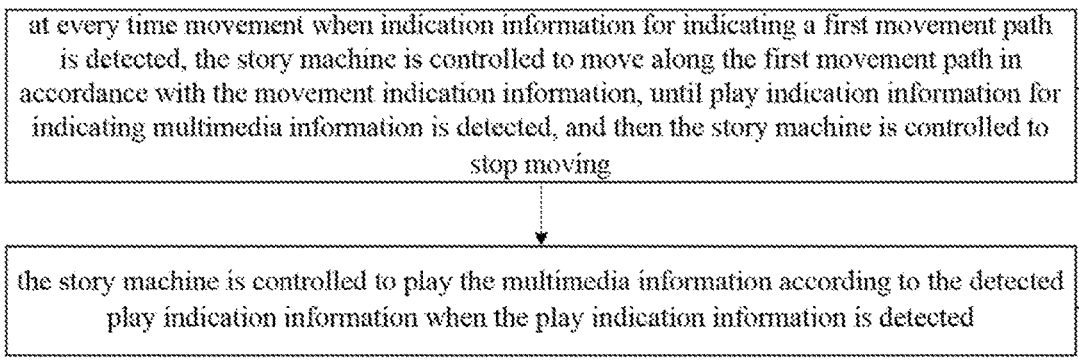
FIG. 5 illustrates a control method for a story machine in accordance with an exemplary aspect of the present disclosure.

In an aspect, there is further provided a storage medium comprising instructions that, when executed by a processing component, cause the processing component to implement the method for controlling the story machine shown in FIG. 5 or FIG. 6A. In an exemplary aspect, there is further provided a non-transitory computer readable storage medium comprising instructions, such as a memory including the instructions. The instructions may be executed by the processing component of the story machine to complete the method for controlling the story machine. For example, the non-transitory computer readable storage medium may be a ROM, a random access memory (RAM), a CD-ROM, a magnetic tape, a floppy disk, an optical data storage device, etc.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A story machine, comprising:
  circuitry configured to:
    detect movement indication information for indicating a first movement path of the story machine;
    control the story machine to move along the first movement path based on the detected movement indication information;
    detect play indication information for indicating multimedia information;
    control the story machine to stop moving in response to detecting the play indication information; and
    play the multimedia information based on the detected play indication information.

2. The story machine according to claim 1, wherein the circuitry is further configured to:
  acquire a second movement path associated with the detected play indication information; and
  control the story machine to move along the second movement path away from a position where the play indication information is detected after the multimedia information has been played.

3. The story machine according to claim 1, wherein the story machine further comprises a bearing portion, a roller, and a driving structure, wherein the circuitry of the story machine is fixed on the bearing portion, and
  wherein the roller is provided below the bearing portion, and the driving structure is provided inside the bearing portion and is connected to the circuitry and the roller.

4. The story machine according to claim 1, wherein the movement indication information and the play indication information are stored in a two-dimensional code that is provided in a preset map paper, and
  wherein the circuitry is configured to detect the movement indication information via a two-dimensional code scanning component.

5. The story machine according to claim 1, wherein the movement indication information is information sent by wireless signal positioning points arranged in an array, the play indication information is stored in a two-dimensional code, the wireless signal positioning points arranged in the array and the two-dimensional code are provided in a preset map paper, and the wireless signal positioning points are arranged around the two-dimensional code, and
wherein circuitry is configured to detect the movement indication information via a two-dimensional code scanning component and a wireless signal receiving component.

6. The story machine according to claim 4, wherein the two-dimensional code is an invisible two-dimensional code.

7. The story machine according to claim 1, wherein the circuitry is further configured to communicate with a terminal or a server.

8. A story player system, comprising the story machine according to claim 1.

9. The story player system according to claim 8, further comprising:
at least one map paper, each being provided with a two-dimensional code, or each being provided with wireless signal positioning points arranged in an array and a two-dimensional code.

10. A method for controlling a story machine, comprising:
detecting movement indication information for indicating a first movement path of the story machine;
controlling the story machine to move along the first movement path based on the detected movement indication information;
detecting play indication information for indicating multimedia information;
controlling the story machine to stop moving in response to detecting the play indication information; and
playing the multimedia information based on the detected play indication information.

11. The method according to claim 10, further comprising:
acquiring a second movement path associated with the detected play indication information; and
controlling the story machine to move along the second movement path away from a position where the play indication information is detected after the multimedia information has been played.

12. The method according to claim 11, wherein acquiring the second movement path associated with the detected play indication information comprises:
inquiring a preset corresponding relationship between the play indication information and movement path to obtain the second movement path corresponding to the detected play indication information.

13. The method according to claim 11, wherein the movement indication information and the play indication information are stored in a two-dimensional code that is provided in a preset map paper;
wherein the method further comprises:
scanning the map paper to detect the two-dimensional code after the story machine is placed on the map paper;
stopping scanning the map paper in the process of movement along a designated movement path, wherein the designated movement path is the first movement path or the second movement path; and
beginning to scan the map paper once reaching the end of the designated movement path.

14. The method according to claim 10,
wherein controlling the story machine to move along the first movement path based on the movement indication information comprises:
acquiring the first movement path based on the movement indication information; and
controlling the story machine to move along the first movement path to the end of the movement path,
wherein controlling the story machine to play the multimedia information based on the detected play indication information comprises:
acquiring the multimedia information based on the detected play indication information; and
controlling the story machine to play the multimedia information.

15. The method according to claim 14, wherein acquiring the first movement path based on the movement indication information comprises:
acquiring at least two movement paths corresponding to the movement indication information, each movement path corresponding to a device type;
determining device type of the story machine; and
selecting the movement path corresponding to the device type of the story machine as the first movement path from the at least two movement paths.

16. The method according to claim 14, wherein acquiring the multimedia information based on the detected play indication information comprises:
acquiring at least two kinds of candidate multimedia information corresponding to the detected play indication information, each of the candidate multimedia information corresponding to a play mode;
determining a current play mode of the story machine; and
selecting the candidate multimedia information corresponding to the current play mode as the multimedia information corresponding to the detected play indication information from the at least two kinds of multimedia information.

17. The method according to claim 11, wherein the movement indication information is information sent by wireless signal positioning points arranged in an array, the play indication information is stored in a two-dimensional code, the wireless signal positioning points arranged in the array and the two-dimensional code are provided in a preset map paper, and the wireless signal positioning points are arranged around the two-dimensional code,
wherein the method further comprises:
scanning the map paper to detect the wireless signal positioning points after the story machine is placed in an area of the map paper where the wireless signal positioning points are located;
continuously scanning the wireless signal positioning points in the process of movement along a designated movement path, wherein the designated movement path is the first movement path or the second movement path; and
stopping scanning the map paper once reaching the end of the designated movement path.

18. The method according to claim 14, wherein acquiring the multimedia information based on the detected play indication information comprises:
acquiring the multimedia information locally or from a server based on the detected play indication information.

19. A device for controlling a story machine, comprising:
a processor; and
memory configured to store instructions executable by the processor,
wherein the processor is configured to:
detect movement indication information for indicating a first movement path of the story machine;

control the story machine to move along the first movement path based on the detected movement indication information;

detect play indication information for indicating multimedia information;

control the story machine to stop moving in response to detecting the play indication information; and play the multimedia information based on the detected play indication information.

20. A non-transitory computer-readable storage medium storing instructions that, when executed by one or more processors of a computing device, cause the computing device to implement the method for controlling the story machine according to claim 10.

* * * * *